US010774898B2

(12) United States Patent
Fereidooni et al.

(10) Patent No.: US 10,774,898 B2
(45) Date of Patent: Sep. 15, 2020

(54) COMPACT VIBRATION REDUCING HUMAN SUPPORT

(71) Applicant: NATIONAL RESEARCH COUNCIL OF CANADA, Ottawa (CA)

(72) Inventors: Amin Fereidooni, Ottawa (CA); Viresh Wickramasinghe, Ottawa (CA); Yong Eric Chen, Ottawa (CA)

(73) Assignee: National Research Council of Canada, Ottawa, Ontario (CA)

( * ) Notice: Subject to any disclaimer, the term of this patent is extended or adjusted under 35 U.S.C. 154(b) by 110 days.

(21) Appl. No.: 15/829,246

(22) Filed: Dec. 1, 2017

(65) Prior Publication Data
US 2018/0156306 A1    Jun. 7, 2018

(30) Foreign Application Priority Data

Dec. 2, 2016    (CA) ..................... 2950508

(51) Int. Cl.
*F16F 15/08*    (2006.01)
*F16F 15/03*    (2006.01)
(Continued)

(52) U.S. Cl.
CPC ............ *F16F 15/08* (2013.01); *F16F 15/002* (2013.01); *F16F 15/005* (2013.01);
(Continued)

(58) Field of Classification Search
CPC .... F16F 15/08; F16F 7/00; F16F 1/373; F16F 1/3605; F16F 15/022; F16F 1/3849;
(Continued)

(56) References Cited

U.S. PATENT DOCUMENTS

| 4,944,554 A | * | 7/1990 | Gross | A47C 7/462 |
| | | | | 297/284.3 |
| 5,002,336 A | * | 3/1991 | Feher | A47C 7/744 |
| | | | | 297/180.13 |

(Continued)

FOREIGN PATENT DOCUMENTS

EP    0811784 A2 * 12/1997    ........... F16F 7/1011

OTHER PUBLICATIONS

Branco NA Castelo and E Rodriguez. The vibroacoustic disease—an emerging pathology. Aviation, space, and environmental medicine, 70(3 Pt 2):A1-6, 1999.
(Continued)

*Primary Examiner* — Bradley T King
*Assistant Examiner* — Mahbubur Rashid
(74) *Attorney, Agent, or Firm* — Jason E. J. Davis

(57) ABSTRACT

A vibration reduction (VR) human support has exactly two paths to ground in each degree of VR: one provided by respective displacement actuators (DAs) for active VR, the other by one or more elastomeric damping bodies (EDBs). These paths extend from a frame for carrying a support structure for a live human, to a grounding for fixing the VR system in a vibrating environment. Each EDB is composed of a material having a dynamic Young's Modulus of 0.1-2.5 MPa, and a resilience test rebound height less than 40, and is positioned between the grounding and frame to provide elastic restorative forces and damping in each of the respective directions. The use of EDBs simplifies construction, and allows for a more compact arrangement, without reducing VR efficiency.

19 Claims, 1 Drawing Sheet

(51) Int. Cl.
*F16F 15/02* (2006.01)
*F16F 15/00* (2006.01)
*F16F 15/18* (2006.01)

(52) U.S. Cl.
CPC .......... *F16F 15/022* (2013.01); *F16F 15/03* (2013.01); *F16F 15/18* (2013.01)

(58) Field of Classification Search
CPC .......... F16F 1/445; F16F 3/093; F16F 15/002; F16F 15/03; F16F 15/124; F16F 15/02; F16F 15/04; F16F 15/00; F16F 15/085; F16F 1/128; F16F 1/16; F16F 1/3732; F16F 3/00; F16F 7/104; F16M 13/00; F16M 13/04; B60N 2/502; B60N 2/509; B60N 2/54; B60N 2/68; B60N 2205/20
See application file for complete search history.

(56) References Cited

U.S. PATENT DOCUMENTS

| | | | | |
|---|---|---|---|---|
| 5,133,527 | A * | 7/1992 | Chen | F16F 15/03 248/550 |
| 5,431,360 | A * | 7/1995 | Yu | B64D 25/04 105/345 |
| 5,582,385 | A | 12/1996 | Boyle et al. | |
| 5,631,506 | A * | 5/1997 | Paden | F16F 1/3732 29/596 |
| 5,660,255 | A | 8/1997 | Schubert et al. | |
| 5,730,429 | A * | 3/1998 | Ivers | F16F 1/3605 267/140.14 |
| 5,765,800 | A | 6/1998 | Watanabe et al. | |
| 5,833,320 | A * | 11/1998 | Kaneko | B60N 2/70 297/452.27 |
| 5,887,858 | A * | 3/1999 | Su | F16F 15/02 188/379 |
| 6,211,775 | B1 * | 4/2001 | Lee | G08B 6/00 340/407.1 |
| 6,662,560 | B2 * | 12/2003 | Roy | A47C 1/12 60/545 |
| 6,746,005 | B1 | 6/2004 | Su et al. | |
| 7,069,787 | B2 * | 7/2006 | Crowson, II | G01M 7/04 297/217.3 |
| 7,159,942 | B2 * | 1/2007 | Costaglia | A47C 1/023 297/311 |
| 7,178,794 | B2 * | 2/2007 | Runyon | F16F 13/002 267/64.27 |
| 7,571,793 | B2 | 8/2009 | Warmerdam et al. | |
| 7,726,452 | B2 | 6/2010 | Kraner | |
| 7,997,648 | B2 * | 8/2011 | Becker | B60N 2/0284 297/284.11 |
| 8,047,512 | B2 | 11/2011 | Mizushima et al. | |
| 8,186,490 | B2 * | 5/2012 | Melz | B60N 2/501 701/37 |
| 8,360,387 | B2 | 1/2013 | Breen et al. | |
| 8,725,351 | B1 * | 5/2014 | Selden | B60N 2/501 701/37 |
| 8,899,393 | B2 | 12/2014 | Kraner et al. | |
| 2002/0113191 | A1 * | 8/2002 | Rolt | B81B 7/0012 248/550 |
| 2002/0135112 | A1 * | 9/2002 | Allaei | D03D 49/025 267/136 |
| 2003/0169412 | A1 * | 9/2003 | Hazelton | G03F 7/70766 355/72 |
| 2006/0261647 | A1 | 11/2006 | Maas et al. | |
| 2007/0164189 | A1 * | 7/2007 | Corsaro | F16F 15/005 248/614 |
| 2008/0009776 | A1 * | 1/2008 | Trandafir | A61H 1/005 601/53 |
| 2008/0211151 | A1 * | 9/2008 | Wieser | B60N 2/68 267/136 |
| 2009/0164051 | A1 | 6/2009 | Vervoordeldonk | |
| 2012/0158191 | A1 | 6/2012 | Rijnveld et al. | |
| 2012/0241268 | A1 | 9/2012 | Laro et al. | |
| 2013/0092814 | A1 | 4/2013 | Breen et al. | |
| 2013/0180350 | A1 | 7/2013 | Kraus et al. | |
| 2013/0328253 | A1 | 12/2013 | Kraner et al. | |
| 2014/0263932 | A1 | 9/2014 | Schroeder et al. | |
| 2015/0069173 | A1 | 3/2015 | Cranga et al. | |
| 2016/0336843 | A1 * | 11/2016 | Da Concei O Rosa | F16F 15/03 |

OTHER PUBLICATIONS

Yong Chen, Viresh Wickramasinghe, and David Zimcik. Development of adaptive seat mounts for helicopter aircrew body vibration reduction. Journal of Vibration and Control, 15(12):1809-1825, 2009.
Yong Chen, Viresh Wickramasinghe, and David G Zimcik. Development of adaptive helicopter seat systems for aircrew vibration mitigation. In the 15th International Symposium on: Smart Structures and Materials & Nondestructive Evaluation and Health Monitoring, pp. 69280N-69280N. International Society for Optics and Photonics, 2008.
Yong Chen, Viresh Wickramasinghe, and David G Zimcik. Development of adaptive helicopter seat for aircrew vibration reduction. Journal of Intelligent Material Systems and Structures, p. 1045389X11400343, 2011.
Gregory J Hiemenz, Wei Hu, and Norman M Wereley. Semi-active magnetorheological helicopter crew seat suspension for vibration isolation. Journal of Aircraft, 45(3):945-953, 2008.
Suzanne D Smith. Characterizing the effects of airborne vibration on human body vibration response. Aviation, space, and environmental medicine, 73(1):36-45, 2002.
Viresh Kanchana Wickramasinghe. Dynamics Control Approaches to Improve Vibratory Environment of the Helicopter Aircrew. PhD thesis, Carleton University, 2012.
York David, Wang Xiaojie, and Gordaninejad Faramarz. A New MR Fluid-Elastomer Vibration Isolator. Journal of Intelligent Material Systems and Structures, University of Nevada, Reno, vol. 18, Dec. 2007, pp. 1221-1225.
English Machine Translation of the Abstract for KR 20120111450A.

* cited by examiner

COMPACT VIBRATION REDUCING HUMAN SUPPORT

CROSS-REFERENCE TO RELATED APPLICATIONS

The present application claims priority from Canadian Patent Application No. 2,950,508 filed on Dec. 2, 2016, the content of which is incorporated herein by reference.

FIELD OF THE INVENTION

The present invention relates in general to how to support human bodies in environments that are vibrating, and in particular to supports with active vibration cancellation that can be compact, lightweight and efficient.

BACKGROUND OF THE INVENTION

Vibration is a known problem for human operators, users, passengers, etc. of equipment and vehicles. It is known to dampen vibration with passive, active, or semi-active damping techniques. These techniques have different merit for different problems, but generally, for high levels of vibration reduction, active control is required. This is essentially because passive damping generally lacks sufficient absorption efficiency, even over a narrow range of frequencies and moderate amplitudes. Passive damping also lacks adaptivity: a mass and spring of a given frequency, cannot adapt itself to an input force of changing frequency. Semi-active solutions are adaptive to changing frequencies, but generally reduce vibration less than desired, even if feedback and control are perfectly tuned.

Systems for vibration suppression of rotary-wing aircraft are specifically discussed in the literature. A variety of active or semi-active and passive systems are known. Helicopter vibration control has been examined at the source (rotor) with passive and active blade vibration control, as well as local solutions with passive damping and semi-active damping of seats. The vibration control of local structures such as the trim panels, seat structures and the seat cushions are tempting because these systems are subject to fewer certification requirements, offering easier implementation, as well as lower weight penalties [9] than rotor-local vibration suppression strategies.

Neck strain and back injuries are common health problems among, for example, the pilots and co-pilots of rotary-wing aircraft [1, 8]. Vibration from the blades through the fuselage to the human body has been found to create a wide range of health issues: from short term effects such as discomfort and fatigue to long term effects like chronic pain and spinal misalignment [1, 8].

All vibration frequencies are not equally harmful for humans, and it is far easier to design a system that improves a narrow range of vibration frequencies, than one that suppresses vibrations effectively across a wide spectrum. For instance, Hiemenz et al. [7] integrates two Magneto-Rheological Fluid (MRF) dampers on the side columns of a SH-60 Seahawk crew seat. MRF dampers are "semi-active" vibration control systems, because they are given feedback to respond to current load conditions, but do not supply any force to counter the vibration in response, but rather change the damping properties of the dampers to increase the absorption of the materials given the current dynamics. MRF dampers rely on a material that is sensitive to magnetic field changes, and a field generator. While MRF dampers generally have lower energy consumption than active control strategies, they may be wanting in efficiency of damping.

Using experimental test results, Hiemenz et al. shows that the new system reduced the dominant rotor-induced vertical vibration (4/rev) by 76% for a $50^{th}$ percentile male aviator. However, the 76% reduction in the 4/rev component does not result in a desired level of improvement on the pilot's comfort or well-being, mainly because the human body is less sensitive to the 4/rev component than lower harmonics, especially 1/rev. Although the transmissibility of the modified Seahawk seat is considerably reduced for medium and high frequency ranges (above 8 Hz) such as 4/rev component, it does not show significant improvements for the lower frequency range (between 0.5 Hz to 8 Hz) where the 1/rev excitation is expected. In some cases, the transmissibility of the modified seat is even higher than the unmodified seat in the lower frequency range. Furthermore, it should be noted that integrating the MRF dampers into the structure of the seat requires modification and certification of the existing seats for every type of helicopter.

As another example in the helicopter vibration context, consider various pilots with different weights using a same seat cushion system. Chen et al. [2, 3] evaluate the performance of different seat cushion materials for mitigating whole body vibration (WBV) exposure in a Bell-412 helicopter. It is demonstrated that the use of a meticulously designed cushion reduces the vibration level by 24.9% in terms of health risk for a 50th percentile pilot, but it only reduces vibration level by a value of 0.2% for a 85th percentile co-pilot. While this study was limited to a passive system, it illustrates the difficulties inherent in the problem.

Active control feedback systems have known advantages in terms of damping efficiency, and rely on sensors, feedback electronics and a power supply. The main function of active systems is to add energy to the system by applying a time varying force, with a same magnitude as an observed force, but opposite in phase. The applied forces are usually generated using such active elements as pneumatic, hydraulic, piezo-electric or electromechanical actuators, and they require a relatively large amount of power to operate compared with passive or semi-active devices. While the design of active control systems is research-intensive and costly, it demonstrates a better performance than passive or semi-active control systems.

Chen et al. [4-6] integrated two types of actuators into the helicopter seat structure to dampen unwanted vibration: an electromechanical motor and a piezo-electric actuator. In both cases, significant reduction in vibration level is achieved, for instance, in the latter case, it is reported that overall 26% vibration reduction at the pilot helmet location is achieved. Despite the fact that the active seat performance showed improvement in the overall vibration, major areas of improvement were identified:

The active control results did not show any appreciable reduction to the low frequency vibration, namely, 1/rev harmonic.

The active seat design does not comply with the crashworthiness requirements of helicopter seats.

The piezo-electric actuator lacked a displacement suitable to cancel vibration amplitudes observed.

The bulky size of the electromechanical motor was an undesirable aspect of this type of actuator, and is better suited to lab testing than deployment in aircraft.

US2013/0180350 to Kraus et al. teaches an active bearing for vibration reduction. The active bearing preferably includes a support element for supporting a static load transfer. The support element "typically comprises a suspension spring element or a plurality of suspension spring elements" that is "preferably produced from a material with small damping capacity so that the best possible insulation effect is enabled between vibrating load 8 and support unit 6 at high excitation frequencies". In the embodiment of FIG. 4, the support element is an elastomer molded body that acts as a spring. It is understood that some elastomeric materials behave as springs in their response, while other elastomers are much more like dampers, and visco-elastic materials are somewhere between these extremes. The teachings here suggest the substitution of a suspension spring element with an equivalent elastomeric spring. A dashpot or damper is used to decouple the support element 3 from the dynamic load bearing (force path II). The encasing of an active element for counteracting a dynamic load, with a passive element for transmitting a static load, is shown in FIG. 4.

US 2013/0328253 (253) is addressed not to a support for specifically suppressing 0.5-8 Hz vibrations, but to a system for suppressing all vibrations that interfere with atomic force microscopes, electron microscopes, etc. The teachings include an intermediate mass that is isolated in 6 DoF, and has a plurality of voice coil motors, passive dampers, and springs along different axes to isolate an intermediate mass from the sprung mass and the floor, in order to improve vibration reduction at the sensitive equipment. "Voice coil motors" include a very wide range of devices, from devices in headphones to devices that simulate vibrations of rockets. Given that '253 is directed to avoiding the "small payload vibrations" to which such instruments are "very sensitive" (clearly nobody would put such sensitive equipment in a high amplitude vibration environment that would be of any concern to a human occupant), and given that a "small and inexpensive actuator" is preferred, it is submitted that a small voice coil motor is inherent to this application. At [0006] the patent does not indicate that the extremely small displacement of piezoelectric actuators is problematic, but that voice coil motors can be used unlike the suggestion in U.S. Pat. No. 5,660,255 to reduce cost. Small and inexpensive voice coil motors are beneficially compact, but are not powerful enough to effectively drive higher amplitude vibrations encountered in many applications, even if such voice coil motors are likely sufficient to cancel noise in a generally quiet lab for operating such scientific equipment. The addition of an intermediate mass, with clearances required for its movement, and the multiplication of joints, makes compactness a problem, even if the design could be modified to provide the force and actuation length required for application in noisier environments.

Patent applications, such as US 2014/0263932 and US 2013/0092814 show active vibration cancellation systems with a spring and an actuator with suitable linkages that appear to be compact and suitable for deployment under a seat. Suitability for suppressing 0.5-8 Hz vibrations is not considered or discussed, and is not inferable.

In rotorcraft seats, as in many stations for operating, monitoring, or supporting people near, vibrating equipment, there is a need for a compact, lightweight, active system for cancelling vibrations.

SUMMARY OF THE INVENTION

Applicant has discovered a surprisingly effective vibration reduction system (VRS) having active and passive components. The VRS is remarkably compact and suitable for deployment in a wide variety of conditions. As can be seen from the survey of patent literature in the background of the invention, the use of dampers or dashpots in parallel with active vibration control is not prevalent in the art, especially where a force amplitude of the vibrations is high. This may be because the dampers resist the actuator just as much as they passively suppress vibrations: the actuator has to counteract the damper prior to delivering any canceling vibrations, which effectively decreases the power of the actuators. Adding size and weight by use of higher power actuators are generally to be avoided.

The VRS comprises a ground, a frame for carrying a support structure adapted to support a live human, at least one motor actuator path between the ground and frame adapted to cancel vibrations in at least one direction, and for each of the at least one directions, a parallel path consisting of an elastomeric damping body (EDB) between the ground and frame, the EDB positioned so that elastic restorative forces are oriented in the respective direction. No other path is provided to couple between the ground and frame in the at least one direction, at least under normal operating conditions, or when active vibration control is being applied by the VRS. The VRS includes a means for sensing vibrations and for forwarding feedback to a controller of the actuator.

The use of an EDB in accordance with the present invention is not a simple substitute for dampers, or a spring with a damper: they provide substantial advantages for designing and assembling compact VRSs, which is especially important when a number of degrees of freedom of the vibration to be damped is 2 or more, or stringent controls are placed on size and weight of the VRS. Furthermore, a shape factor of the EDB (defined herein as a selection of a geometry of the elastomer to control both the amount of elastomer between ground and support, as well as the free space into which the elastomer may bulge or extend) allows for tuning of elastic and damping characteristics of the material. Like both springs and dampers, the shape of EDB can be arranged to exhibit very high stiffness in all degrees of freedom but one, to make sure the VRS is stable, but they can do so in a much more compact arrangement as the EDB does not require a prismatic joint or other shock absorber type structure.

The EDB is preferably selected so that a static deflection under the anticipated load of 5-25%, more preferably 7-14%, preferably 10% is provided, so that when the VRS is operating, the actuator has a limited resistance profile from the EDB over a full range of the actuator. The EDB has some elastic behavior as well as some absorption behavior that may not be exactly proportional to velocity. It will be appreciated that EDBs typically exhibit a loss of linearity that is more pronounced at high deformation. Preferably, throughout a displacement range of the actuators the EDB remains substantially linear. Alternatively accurate operation in this regime is possible with characterization of the material in this regime that is not subject to degradation or aging, for an intended duration of deployment.

Applicant has found that use of an EDB, with some spring action but mostly damper action (e.g. a resilience rebound height of less than 40, more preferably 3 to 30, more preferably 5 to 15), can bear a static component of the supported load, while facilitating the actuator to perform active vibration cancellation provides a remarkable improvement over known designs, and improves a form factor of the system. The use of an EDB makes it practical, for the first time, to use a VRS in a host of applications where they were needed, but not believed to be cost efficient.

Accordingly, vibration reduction system VRS is provided, the VRS comprising a grounding for fixing the VRS to a vibrating environment; a frame for carrying a support structure suitable for supporting a live human; a plurality of displacement actuators, each having a stator end, an actuator end, and a displacement extension range in a direction associated with the respective actuator, with each of the actuators having one of the stator end and actuator end affixed to the frame, and the other to the grounding; one or more elastomeric damping bodies (EDBs) composed of a material having a dynamic Young's Modulus of 0.1-2.5 MPa, and a resilience test rebound height less than 40, positioned between the grounding and frame to provide elastic restorative forces and damping in each of the respective directions; and no other path to couple the ground to the frame in any of the respective directions under normal operating conditions of the VRS.

The grounding may comprise a bracket for retaining a casing of at least one of the actuators, wherein the bracket: surrounds at least one of the plurality of actuators; is composed of an assembly of separate parts; is adjustable for a size, weight or feature of the live human; is releasably mountable to the grounding, frame or one or more EDBs; or is reconfigurably mountable to the grounding, frame or one or more EDBs in two or more arrangements.

A first of the at least one EDBs may be mounted on one side to a wall of the casing, which squarely faces an opposite wall of one of the grounding structure and frame to constrain the EDB, whereby the casing is part of the frame or grounding structure.

The bracket may have a surface, and a first of the at least one EDBs may be mounted on one side to the bracket surface, which squarely faces an opposite wall of one of the grounding structure and frame to confine the EDB. The first EDB alone, or with one or more of the at least one EDBs, is arranged so that the EDB rotationally symmetrically surrounds the actuator end of the first actuator, or the first EDB's axis is collinear with the direction of the first actuator.

The VRS of any one of claims 1 to 4 where the axis of the first EDB is parallel to both first and second actuators of the plurality of actuators, and the first EDB alone, or with one or more of the at least one EDBs, are arranged to lie: symmetrically between the first and second actuators, symmetrically around the first and second actuators; or both.

The first and second actuators may be: aligned to a common plane and the symmetry is rotational symmetry about a centre of the first and second actuators in this plane; or oriented oppositely and offset by 0.5-1 times a width of the first and second actuator bodies in an offset direction that is perpendicular to the direction of the first and second actuators, and the symmetry is rotational symmetry about a centre of the first and second actuators in a plane spanned by the offset direction and the direction of the first and second actuators.

The VRS may further comprise a sensor sensitive to vibrations and a feedback circuit for controlling motors of the plurality of actuators.

The actuation directions of the plurality of the actuators may span 1, 2 or 3 Cartesian directions. An equal number and power of the actuators may be provided in each actuation direction, and each EDB may have an equivalent absorption profile. Alternatively a higher number of actuators or higher power actuators are disposed in directions of greatest vibration amplitudes, or in directions where vibrations are more injurious to an occupant.

The one or more EDBs preferably have a shape factor to control stiffness and damping in multiple degrees of freedom.

The material may have a resilience test rebound height of 3-30 or more preferably 5-15. It may be sorbothane.

Each of the actuators may have a displacement actuation range of 0.75-25 mm, or more preferably of 0.8-8 mm. The actuators may be adapted to exert a force of at least 20 N.

The human support may be designed to support a whole human body, or part thereof, in one or more poses and orientations, including standing, seated, or squatted, erect, recumbent, or partially recumbent. The human support may be a floor, chamber, panel, seat, armrest, table, bench, bed, sling, hammock, harness or suspension system.

The VRS may further comprise a failure support in event of excessive force that engages to mechanically couple the frame to the grounding that bypasses the actuators, in the event of a force that exceeds a threshold.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Herein a technique is described for reducing vibration through a human support that is supported in a vibrating environment, especially one where the vibrations are in the frequency range of 0.5-80 Hz and of an amplitude that is not healthy for human occupancy, with a significant amplitude in the range of 0.5-8 Hz. The human support may be for a whole human body, or part thereof, in any pose and orientation, such as standing, seated, or squatted; erect, recumbent, or partially recumbent. The human support structure may be a floor, chamber, panel, seat, armrest, table, bench, bed, sling, hammock, harness or suspension system, and has at least one surface for supporting at least one human in at least one pose and orientation. In one or more degrees of freedom Vibration Reduction System (VRS) only has a plurality of displacement actuators and elastomers separating the human support structure from the vibrating environment.

Figure 1:
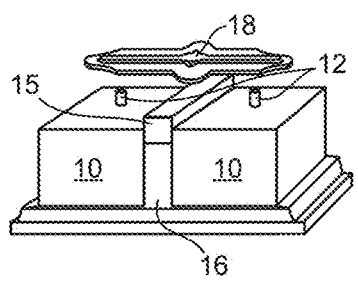
FIG. 1 is a schematic illustration of a 1 DoF vibration reduction system (VRS) in accordance with an embodiment of the present invention.

FIG. 1 is a schematic illustration of an embodiment of a 1 DoF VRS in accordance with an embodiment of the present invention. The VRS comprises two linear displacement actuators 10, each having an enclosed motor and a reciprocating actuator end 12. An elastomeric damping body (EDB) 15 is provided between the two actuator ends 12 for passive damping of vibrations. The actuators 10 and EDB 15 are held by a flanged structure 16 for securing to a ground in a vibrating environment, which may be a hard supporting frame, wall or floor of a vehicle or machine. A bracket 18 is provided to be affixed to the human support so that no part of the human support is designed to contact the VRS during ordinary operation. Herein ordinary operation is contrasted with damaging events such as a collision, or failure, or less damaging events such as operation with VRS disabled, which may cause directly or indirectly, or result in a mechanical coupling of the ground with the human support. It will be appreciated that design of a VRS may involve defining motion tolerances that specify ordinary operating conditions, and disabling the VRS may involve mechanically coupling the human support to ground.

The actuator 10 has a motor with stator and actuator ends, and is controlled by a controller that receives feedback from a sensor that reacts to vibrations. The actuators 10 preferably have a displacement of 0.75-25 mm, more preferably from 0.8-8 mm, or from 1-5 mm, and are preferably adapted to exert a force of at least 20 N at every position of the actuator. An operating frequency of the actuator is preferably higher than about 80 Hz. The actuator may be a moving coil actuator, moving magnet actuator, or a moving iron actuator, although any other actuator with these parameters, adequate control and responsiveness can equally be employed. A voice coil motor having these properties is currently preferred, although demonstration was with a moving iron controllable actuator as described herein below.

While the illustrated actuator 10 is linear in that the actuation is a displacement of the actuator end 12 in a linear path that extends in a direction of a longitudinal axis of the actuator end 12, this is not strictly necessary. Displacement actuators that displace the actuation end 12 along a curved path with sufficient stiffness, response time, and displacement range, can be accommodated by obvious design modifications. Curved actuation paths may be preferred for some arrangements and geometries. Furthermore, linkages with fixed degrees of freedom and ranges can be used to permit multiple degree of freedom controls that minimize the total compliance of the VRS while permitting unconstrained, concurrent and independent vibration reduction in multiple directions (degrees of freedom), and further can be used to increase a displacement range, or a rate of displacement at some states of actuation, for some designs.

The EDB 15 preferably has a stiffness for supporting at least a bulk of the static load of the human support and its occupant, relieving the actuators 10 of this burden. The EDB 15 is chosen such that it has a stiffness constant k that is approximately equal to the product of an expected mass of the system (when loaded) with the square of a desired angular damped frequency of the system.

The flanged structure 16 illustrated is only one structure for affixing the actuators 10 to the environment, just as bracket 18 is one structure for affixing to the human support. It will be appreciated that a wide variety of spatial constraints in the human support and environment may call for a variety of structures for grounding, and depending on an intended deployment, a variety of affixing structures, an adjustable affixing structure, or a reconfigurable affixing structure can be used for either or both of these components.

The specific grounding structure (flanged structure 16) meets both actuator bodies on 4 sides, and provides a rigid wall between the actuators 10, that shelters the actuator body from damage in the event of excessive force from the human support via bracket 18. In some embodiments, ground structures cover 5 or 6 sides of the actuators. In embodiments where the actuator body has a satisfactory stiffness, the grounding may be as simple as a plurality of bolt couplings to the actuator bodies.

While a unitized ground structure is shown, the grounding structure can be provided in an assembly of parts, that may separately ground each actuator 10, and each EDB 15.

While the illustrated embodiment has a stator end of both actuators 10 grounded, it will be appreciated that an inverse scheme is mechanically identical, and the actuator end 12 of one or more of the actuators 10 may be grounded, and the stator end may be coupled to a bracket 18 or like mounting.

A damping function of the EDB 15 in the intended direction—parallel to the actuator axes (herein the EDB axis) is commensurate with an elastomeric material having a rebound resilience test (rebound height) of less than 15 as measured with ASTM D 2632-92. It will be noted that while the illustrated embodiments herein show EDBs oriented so that the EDB axis corresponds with compression/tension, this is by no means necessary. It will be appreciated that shear modes typically exhibit more symmetric restorative forces, and have lower elastic constants than compression/tension when substantially equal thickness, length and width shape factor are provided. As no universal relationship between loss moduli in compression/tension vs. shear is known, an equivalent damping function provided in shear mode requires characterization.

Because the VRS has only 1 DoF, compliances in other Cartesian directions (shearing of EDB 15) may be undesirable. A material of which the EDB 15 is composed, may mechanically be an isotropic material having no natural preferential orientation, but the EDB 15 is shaped, and secured to both the flanged support 16, and bracket 18, to produce a known, stiffness constant k (compression/tensile) defined above and preferably far higher k values (shearing) in off axis directions. In the embodiment of FIG. 1 these shearing movements are limited by constraining the EDB 15 between the relatively stiff actuator casings in an X direction, and by the shape factor in the Y direction.

The Y direction shear stiffness shows a natural way to obtain higher stiffness in one or more directions than others by controlling an arrangement of the EDB 15. For example, flat, solid planar EDB sandwiched between locally parallel faces of the support 16 and bracket 18 will have a higher resistance to roll, and shear movements the larger the surface area at the parallel faces. While larger surface areas will also impact compressive and tensile stiffness when designing such a system, one needs to strike a balance between the selection of material composition, thickness, and surface area to be jointly optimized in Y and Z directions. Thus the shape factor of the EDB can have a considerable impact on the directional stiffness of the EDB even if the EDB is isotropic.

Alternatively the material may be effectively anisotropic, for example because of an alignment or orientation preference of polymer strands (e.g. produced by drawing), or because of macro-structuration and arrangement of voids of the material that allows for bulge of the elastomer in one or more directions to a much greater extent than other directions. Macro-structuration may be produced by patterning films of (possibly partially uncured) films, stacking or rolling of the patterned films and consolidation. Naturally composite materials with different material properties and acceptable bonding can be engineered to exhibit desired properties. The deformation direction of the EDB, i.e. the direction along which the EDB 15 absorbs energy and elastically restores shape to a highest degree, is referred to as the axis of the EDB 15, and is parallel to the longitudinal axis of the actuator end 12. In each direction of actuation by the actuators 10, there is at least one EDB 15 with an axis in that direction.

Preferably the EDB 15, and actuator ends 12 are close together, in a common plane, and arranged so that force applied by the actuator(s) are surrounded by, or surround the force applied by the EDB(s), as this reduces a shearing force applied by expected differences in phase of these two forces.

The VRS includes a sensor and feedback processor for controlling the motor (not shown). The sensor is sensitive to vibration of one or more of: the human support, part of an occupant of the human support, or the bracket 18. Known sensors with their attendant limitations and advantages can be used for this purpose. Given the variety of vibrating environments to which this invention is amenable to deployment, a variety of sensing strategies can be preferred. For example, positioning of a feedback sensor may make a considerable difference to the resulting comfort and well-being of an occupant, for a range of occupant parameters. In a seated position, the sensor may be placed in the seat between shoulder blades of an occupant to assess vibration close to where the neck is supported. If available, the sensor may be mounted on, or may measure by line of sight, a helmet, visor, shoulder, or neck-piece. The sensor may also be mounted to the bracket 18, for a most local measurement of the human support, and a most compact VRS. However, an advantage of mounting the sensor to a rigid mechanical structure (generally excluding the occupant) is simplicity of the feedback control architecture: with a well characterized support structure with known compliances and geometry, and a model thereof, or with some empirical examination, a single solution can be provided for optimized vibration cancellation. Subtle changes in posture of the occupant may change vibration coupling between the seat and head (or other sensitive area), and thus an adaptive response may be required of the VRS. Furthermore some artifacts of intentional movements of the human may be difficult to separate from the vibration, resulting in increased vibrations due to motion from the human. Advantages of mounting the sensor closer to the specific tissue of concern in a human occupant include: a possibly higher accuracy of attenuation; a possibly higher efficiency utilization of the VRS; and an ability to monitor quantified frequencies and amplitudes of vibrations of the occupant.

Figure 2:
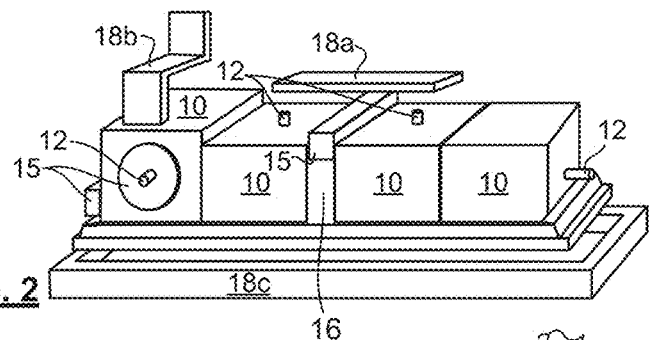
FIG. 2 is a schematic illustration of a 3 DoF VRS with 4 motors, in accordance with an embodiment of the present invention.

FIG. 2 schematically illustrates a 3 DoF VRS having 4 actuators 10. Herein reference numerals identify like components, and descriptions of such features are not generally repeated. Two of the actuators 10 are oriented in a z direction, and essentially replicate FIG. 1. Two additional actuators 10 are provided: one oriented in a −y direction (extreme left), and one oriented in a −x direction (extreme right). For every direction of actuation there is at least one EDB 15 with an axis in that direction. It will be appreciated that in embodiments where vibrations in one direction (z in this case) are expected in a higher amplitude than in the other two, or more harm to an occupant results from vibration in one direction than the others, the VRS may have more power to deliver vibration reduction in that direction, which may be supplied with more actuators 10. In a helicopter, for example, it is known that vibrations in the z direction are higher than in the x or y.

The EDBs 15 shown in FIG. 2 are in three general positions relative to the actuator ends 12: in the z direction the EDB 15 is between the actuator ends 12; in the x direction the EDB 15 is located in a plane with the actuator end 12, but facing an opposite direction; and in the y direction the EDB 15 is an annular cylindrical body that surrounds the actuator end 12. In each of these arrangements a difference in the phases of the actuator vs. EDB response leads to no net moment on the frame 18 because of a symmetry (the line of action of the actuators and EDB are symmetric, or opposed). It will be appreciated that stiffening or reinforcing the actuator body bearing actuation in the x and y directions may be required so that the two EDBs 15 mounted to it, are desirably stiff. Either of these EDBs may additionally or alternatively be mounted to the flanged structure 16.

While the grounding of the 3 DoF VRS is much the same as the embodiment of FIG. 1, the 3 directions of active excitation calls for some attention to the mounting to the human support. Generally there are three mounting strategies that can be employed: the use of a single, rigid frame for communicating all 3 excitation directions, with some joints of limited motion to accommodate mutually orthogonal excitations; the use of limited stiffness members to couple each respective excitation to the human support, where the energy imparted to the human support is partially lost do the limited stiffness, but the 3 excitations can be applied to the human support in close proximity; or the three excitations are coupled to the support strategically at positions with minimal interference, where the other excitations have limited interaction with the human support, or are separated by enough material to reduce substantial interference.

In FIG. 2, each of the brackets are shown translated upwards (18a,b) or downwards (18c) of its useful position, so as to afford a view of the actuators 10, ends 12, etc., and the means for joining these brackets to the human support are not illustrated.

In the 3 DoF VRS, the y direction excitation is coupled to the human support via a bracket 18b that has a same inner face for meeting the annular cylindrical elastomeric body 15 and the actuator end 12 concentric therewith. A top segment of the bracket 18b is coupled to the human support to couple the y direction excitation. A frame 18c that surrounds the 3 DoF VRS at an elevation of the −x directed actuator end 12 at the right, meets the elastomeric body 15 at the left. An elevation of the actuator 10 for actuation in the x direction is raised to avoid interaction of the x direction actuator end 12, and bracket 18b with the frame 18c, regardless of displacement in the z direction. This could equally have been provided with a recess in a central column of grounding 16, and placing of a shortened frame 18c around the central column coupled via the EBD, and the end 12. This frame 18c is coupled to the human support to couple excitation in the x direction. The bracket 18a provides a $3^{rd}$ coupling for the z direction, as described in relation to FIG. 1.

Figure 3:
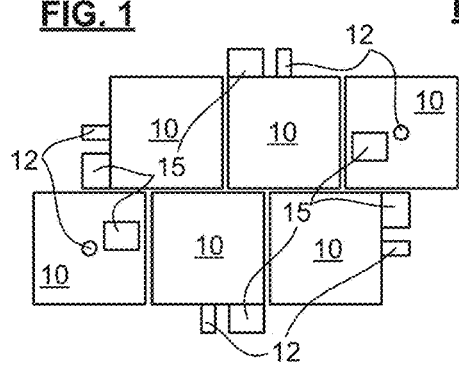
FIG. 3 is a schematic illustration of a 6 motor arrangement for a 3 DoF VRS, in accordance with an embodiment of the present invention.

FIG. 3 is a schematic illustration showing a compact, 3 DoF VRS that is balanced in that the actuators are adapted to apply equal force output in each direction. The schematic illustration shows the planar arrangement of 6 actuators 10, and 6 elastomeric bodies 15. Grounding structures for fixing with respect to the environment and human support are not shown for better illustration. The actuator ends 12 that operate in a same Cartesian axis are oriented in parallel in the z direction, and in the opposite direction in both x and y directions. An advantage of opposite direction orientation is that any variation in elasticity or absorption of the EDB 15 in tension as opposed to extension (or actuator non-linearity in the higher extension states) is effectively cancelled out by the fact that unless the force is null, one is in extension and the other is in compression.

In the z direction, the actuator ends 12 are offset in both the x and y directions. In the y direction, the actuator ends 12 are offset in the x direction, and in the x direction the actuator ends 12 are offset in the y direction. A result of these offsets is a tendency for moments to be applied to the extent that phases of the paired actuators 10 are not aligned. A difference in instantaneous force applied by the actuator ends 12 (that are phase aligned) and that applied by the EDB 15 do not apply a simple shearing stress on the bracket or mounting to the human support because they are concentrically arranged. These shearing stresses are minimized by placing the EDBs between the actuator ends 12 in the illustrated embodiment. Naturally the EDBs could be arranged outside instead of inside the actuator ends 12, or both, to the same effect. The EDBs 15 in the z direction are in line with the actuator ends 12, and a midpoint of these EDBs coincides with a midpoint between the z actuator ends.

The use of nearly cubic EDBs allows for low shear resistances that minimally impede actuation of orthogonal actuators 10.

Figure 4:
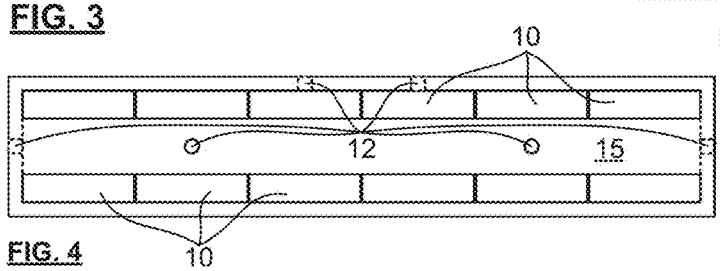
FIG. 4 is a schematic illustration of an in-line 6 motor arrangement for a 3 DoF VRS, in accordance with an embodiment of the present invention.

FIG. 4 schematically illustrates an elongated, balanced 3 DoF, with simplified design that reasonably matches a footprint of a support leg of a helicopter (or like) seat, and may therefore be particularly suited to a retrofit market. The six actuators 10 are aligned with: the two y direction actuators in a middle, flanked by the two z direction actuators, which are in turn, flanked by two x and −x direction actuators. Surrounding the six actuators is one EDB 15 that is shaped like a box with edge strips removed, so that the EDB covers only mid face sections on all four long faces of the rectangular prism it covers. As mentioned earlier, it may be preferred to cover and protect the cases of the actuators, and thus in a preferred embodiment a hard shell is placed between the actuators and the EDB 15. The hard shell has holes in it for the actuator ends 12 (all but two shown in ghost view), and these holes are large enough to never touch the actuator ends 12 in operation. The EDB 15 has through holes through which the actuator ends 12 project. A single hard shell placed over the assembly to cover all sides but the bottom (which is grounded) can serve to couple the actuator ends 12 and EDB 15 to the human support, as long as the couplings allow for sufficient transverse movements to communicate the energy and avoid coupling with the other directed excitations.

Figure 5:
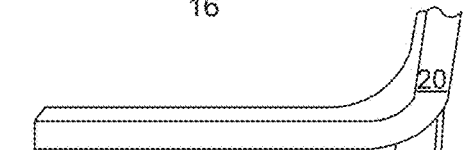
FIG. 5 is a schematic illustration of three 1 DoF VRSs mounted to a support leg of a seat.

For simplicity of illustration, given the widespread use of the structure, and the difficulties with compact seat arrangements, a seat is chosen for illustration as the human support structure in FIG. 5. It will be appreciated that other human support structures could equally be supported with the present VRS design, or with minor modifications thereto. The VRS has particular advantages for deployment in helicopter, or other places where vibrations are high, space and weight are at a premium, and further where crashworthiness is required.

FIG. 5 schematically illustrates part of (bottom of) a seat 20, with a leg support 22. A bank of three actuators 10 forming a first VRS are positioned between a bottom flange of the leg structure 22 and a ground, and are operated to reduce vibrations in the z direction via actuator ends 12 and EDB 15. Two actuators 10 are oriented and mounted to excite vibrations in the x direction by coupling actuator ends 12 and EDB 15 to a bracket 22a forming a second VRS. Two actuators 10 (only one partially in view) are oriented and mounted to excite vibrations in a −y direction in parallel with an EDB and actuator ends (not in view), to form a third VRS. The placement of the three VRSs are preferably chosen with respect to an analysis of propagation modes through the structure, to separate, as much as possible, the independent modes of vibrations, while making mounting and servicing as easy as possible, and with occupant comfort in mind.

In some applications, grouping of the three VRSs in a single unit is preferred, as a high level of integration with the leg structure 22 may call for several different places for replacement of the VRSs. In other applications a minimum occupation of space, and separation of the location of the actuator ends 12 of the different VRSs, is preferred. Mounting in a manner that does not impede certified crash safety seat functionality is essential in some applications.

Advantageously one or more modules that support the seat frame, but otherwise require no modification to the seat, such as shown, have substantial advantages for retrofitting existing seats, and obtaining regulatory approvals. Specific shielding that protects the VRSs in the event of failure is not shown, but can be designed with ordinary skill for a particular problem, in various ways.

Examples

The first step in testing was to select a motor and actuator system, and material and shape factor for the EDB. A Moving Iron Controllable Actuator (MICA 500L™ from Cedrat Technologies™) was chosen for the actuator. The MICA 500L has a stroke of +1-5 mm, a force of 500 N, mobile mass of 1562 g, a size of L×W×H=140×160×160 mm$^3$. It was determined that the EDB should meet the following requirements: support the static load of the pilot and seat, be flexible enough to accommodate the required deflection from the actuators (10 mm), be stiff enough to have a natural frequency above the dominant exciting frequencies, and provide an adequate damping ratio for passive damping effects. Based on these requirements, it was desired that the elastomer should have an elastic modulus in the range of 0.1-1.0 MPa.

After some trial and error, Sorbothane™ was selected as the material for the EDB. Sorbothane (Shore 00 Durometer 30) is a highly damped, viscoelastic thermoset polyurethane material developed for use in shock and vibration applications. The material is reported to have the following properties:

Compressive stress at 10% strain=0.0124 MPa, and at 20% strain=0.0324 MPa; resilience of 11%; and a dynamic Young's Modulus at 5 Hz, of 0.303 [at 10% compressive strain], 0.345 [at 15% compressive strain], and 0.400 [at 20% compressive strain].

Closed loop tests were performed on a test mass on a top plate with the EDB as a flat planar annular shape surrounding the actuator end of the MICA 500L actuator, sandwiched between the top plate and the actuator body. The actuator was mounted to a shaker (Unholtz Dickie 10,000 lb electrodynamic shaker) that was controlled to produce a vibration profile consistent with floor vibration in a Bell-412 helicopter (viz the 1/rev, 2/rev, 4/rev and 8/rev harmonics, with peak amplitudes of 0.03 g). An adaptive feed-forward controller was used to actively reduce vibrations in the test mass. Specifically the controller used the Filtered-X LMS (FLMS) algorithm. This algorithm has been used extensively in the field of active noise and vibration control for many years, and is presumed know by those of skill in the art. Note that only a single-input single-output (SISO) version of the algorithm was called for because of the single degree of freedom of the test setup. A gradient decent search is used to update weights of an FIR filter minimize an error at the control location (a sensor mounted to the test mass). It was found that the addition of an ISO-2631-1 filter, which tunes the vibration reduction proportionately to the frequency's affect on the human body, effectively forces the VRS to work harder against the lower frequency components of the measured signal. Preliminary results show that elimination of more resonance at lower frequencies is possible using such a filter.

Figure 6A:
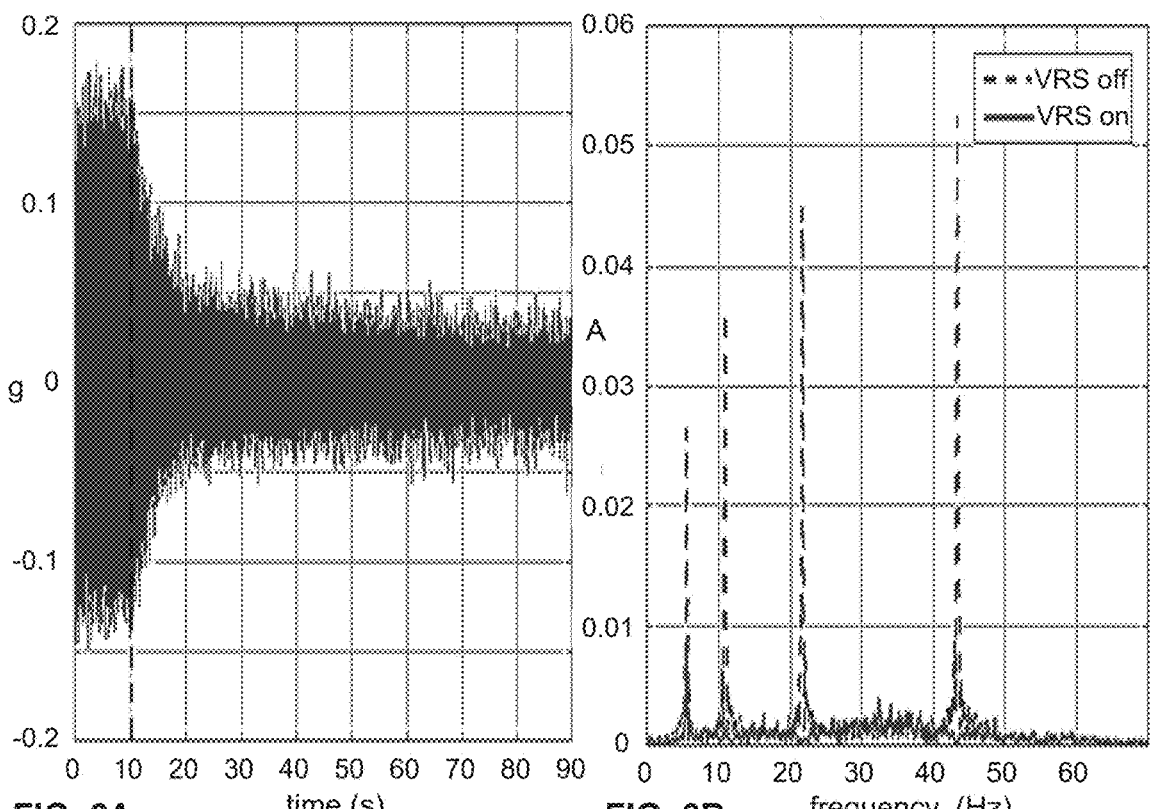
FIG. 6A is a time domain graphs showing acceleration of the mass before and subsequent to activation of the 1 DoF VRS.

FIGS. 6A,B are respectively time domain and frequency domain plots of the test data. The results obtained from the active control tests showed that the VRS was effective at reducing the harmonics of the vibration profile. The first 10 s of the graph of FIG. 6A shows the accelerations at the top plate before the control is turned on. Convergence of the controller is clearly visible thereafter. After 5 s of active control (at 15 s), the vibration level at the top plate is clearly reduced. A converged steady state level is nearly reached by 20 s. After 90 seconds, the g (rms) level had been reduced by 75% from the g (rms) level prior to active control.

Figure 6B:
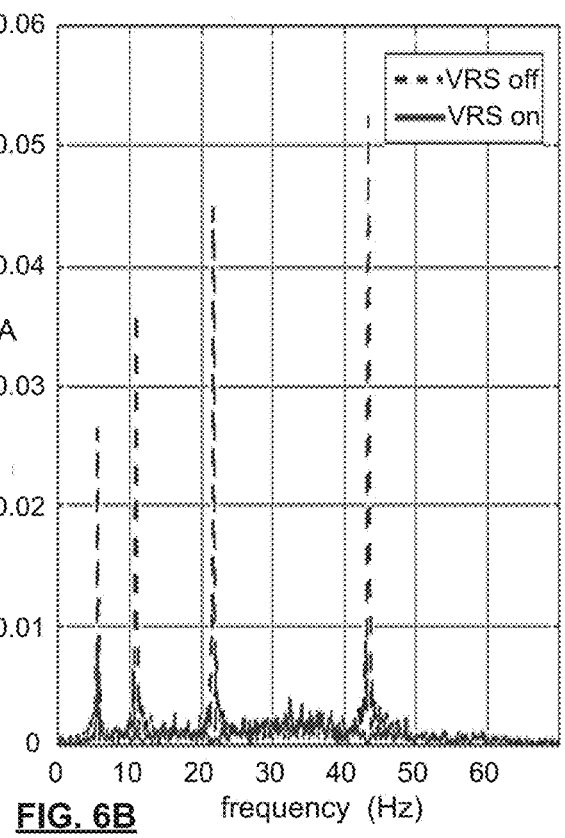
FIG. 6B is a frequency domain graph with plots of Fourier transforms of time domain signals with the VRS turned on and off for comparison.

The frequency domain plot (FIG. 6B) further shows the effectiveness of the VRS algorithm at reducing the vibration spectrum. Each disturbance harmonic was effectively eliminated, except for the 1/rev which was reduced by 67%. With further optimization of the system, it is expected that the 1/rev harmonic can be reduced and likely eliminated. The frequency domain plot FIG. 6B having dashed lines and solid lines are not quite satisfactory for discerning the two plots, especially near a base of the 4 dominant peaks. Because the VRS off plot has multiple narrow peaks near the bases of the major peaks, and these are not resolved, and the lines look solid, but are in fact overlapping and unaligned dashes. The highest the VRS on peak gets in the neighbourhood of the 11 Hz, 22 Hz and 44 Hz peaks is less than 0.0025 g, which is lower than a mean of the VRS on between the peaks.

Note that the actuator was not driven to full capacity during these tests to avoid damage. The specifications of the MICA 500L note that the maximum allowable current through the coil is 20 amps, but a 15 amp limit was set in the controller and monitored using a Hall-effect current sensor to prevent over-driving the actuator. It is expected that the system would be capable of reducing an even higher amplitude vibration spectrum if the full capacity of the actuator is used.

These results were found repeatable and the 1D-VRS is found functional and suitable. The 1/rev and 2/rev harmonics were greatly reduced or eliminated, which had not been achieved in previous research. While the 1D-VRS is simpler than a mannequin and seat assembly, the results are significant and show that higher dimensional VRS can be produced with significantly improved vibration reduction over prior art systems. Furthermore, the use of the EDB in the VRS is established to improve compactness and simplify manufacture, without adversely affecting the efficiency of the VRS.

Thus it is demonstrated that substantial 1 DoF vibration reduction, of the magnitude experienced in helicopter seats, is possible in a design that can be compact enough to avoid substantial redesign of the seat. Some effort was used to improve known control algorithms to achieve the drastic reduction shown. Without the addition of the EDB acting in parallel to the actuator, it is not believed that the VRS would demonstrate this improvement, and further would exhibit no vibration reduction in event of a failed actuator. The EDB enables low frequency, high displacement vibrations to be eliminated while it provides flexibility to accommodate the larger deflection. By applying this approach to higher DoF VRSs, it is expected that similar results can be achieved in the low frequency spectrum.

From a perspective of designing a parallel mechanism for active vibration control, the stiffness and damping are preferably as low as possible, to avoid wasted power fighting the elastic and damping resistances to movement. Lowering the stiffness and damping hits two major limits:

1. If we eliminate too much of the EDB, as the entire weight of the system is on the EDB, the static deflection of the EDB becomes too high, pushing the elastomer behaviour into a non-linear region which is not desirable.

2. It is desired to equip the system to function, in a limited manner, when the active system is not working (either turned off or damaged) for some intended applications. To be fail-safe, the system has to be designed such that it passively damps vibration. In that case, the natural frequency and damping ratio of the system need to be chosen so that the damping is as high as possible, and for the natural frequencies of the system to not lie in the frequency range to which the human body is sensitive.

A compromise was chosen between the low stiffness/damping criterion and the high stiffness/damping criterion for this example, that is particularly suited to helicopter seat application. Selection of EDB material and form factor provide flexibility to control response in multiple degrees of freedom. Constructing VRSs using EDBs allows for light, compact solutions that can easily be adjusted to meet the required specification.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A vibration reduction system VRS with:
 a grounding for fixing the VRS to a vibrating environment;
 a frame for carrying a support structure suitable for supporting a live human;
 a plurality of displacement actuators, each having two ends, including a stator end, an actuator end, and a displacement extension range in a direction associated with the respective actuator, with each of the actuators having one of the two end affixed to the frame, and the other of the two ends affixed to the grounding;
 one or more elastomeric damping bodies (EDBs)
  composed of a material having a dynamic Young's Modulus of 0.1-2.5 MPa, and a resilience test rebound height less than 40%, and
  having a first end affixed to the grounding and a second end affixed to the frame to provide elastic restorative forces and damping in each of the respective directions along an axis of the EDB; and
 no other path to couple the ground to the frame in any of the respective directions under normal operating conditions of the VRS.

2. The VRS of claim 1 where the grounding comprises a bracket for retaining a casing of at least one of the actuators, wherein the bracket:
 surrounds at least one of the plurality of actuators;
 composed of an assembly of separate parts;

is adjustable for a size, weight or feature of the live human;

is releasably mountable to the grounding, frame or one or more EDBs; or is reconfigurably mountable to the grounding, frame or one or more EDBs in two or more arrangements.

3. The VRS of claim 2 where a first of the at least one EDBs is mounted on one side to a wall of the casing, which squarely faces an opposite wall of one of the grounding and frame to constrain the EDB, whereby the casing is part of the frame or grounding.

4. The VRS of claim 1 where the bracket has a surface, and a first of the at least one EDBs is mounted on one side to the bracket surface, which squarely faces an opposite wall of one of the grounding structure and frame to confine the EDB.

5. The VRS of claim 4 where the first EDB alone, or with one or more of the at least one EDBs, is arranged so that the EDB rotationally symmetrically surrounds the actuator end of a first of the actuators, or the first EDB's axis is collinear with a direction of the first actuator's extension range.

6. The VRS of claim 1 where the axis of the first EDB is parallel to both first and second actuators of the plurality of actuators, and the first EDB alone, or with one or more of the at least one EDBs, are arranged to lie: symmetrically between the first and second actuators, symmetrically around the first and second actuators; or both.

7. The VRS of claim 6 where first and second actuators are:

aligned to a common plane and the symmetry is rotational symmetry about a centre of the first and second actuators in this plane; or oriented oppositely and offset by 0.5-1 times a width of the first and second actuator bodies in an offset direction that is perpendicular to the direction of the first and second actuators's extension ranges, and the symmetry is rotational symmetry about a centre of the first and second actuators in a plane spanned by the offset direction and the direction of the first and second actuators's extension ranges.

8. The VRS of claim 1 further comprising a sensor sensitive to vibrations and a feedback circuit for controlling motors of the plurality of actuators.

9. The VRS of claim 1 wherein the actuation directions of the plurality of actuators span 1, 2 or 3 Cartesian directions and: an equal number and power of the actuators are provided in each actuation direction, and each EDB has an equivalent absorption profile; or a higher number of actuators or higher power actuators are disposed in directions of greatest vibration amplitudes, or in directions where vibrations are more injurious to an occupant.

10. The VRS of claim 1 wherein the one or more EDBs have a shape factor to control stiffness and damping in multiple degrees of freedom.

11. The VRS of claim 1 wherein the material has a resilience test rebound height of 3-30.

12. The VRS of claim 1 wherein the material has a resilience test rebound height of 5-15.

13. The VRS of claim 1 wherein the material is sorbothane.

14. The VRS of claim 1 wherein each of the actuators has a displacement actuation range of 0.75-25 mm.

15. The VRS of claim 1 wherein each of the actuators has a displacement actuation range of 0.8-8 mm.

16. The VRS of claim 1 wherein each of the actuators is adapted to exert a force of at least 20 N.

17. The VRS of claim 1 wherein the human support is designed to support a whole human body, or part thereof, in one or more poses and orientations, including standing, seated, or squatted, erect, recumbent, or partially recumbent.

18. The VRS of claim 1 wherein the human support is a floor, chamber, panel, seat, armrest, table, bench, bed, sling, hammock, harness or suspension system.

19. The VRS of claim 1 further comprising a failure support in event of excessive force that engages to mechanically couple the frame to the grounding that bypasses the actuators, in the event of a force that exceeds a threshold.

* * * * *